United States Patent [19]
Schwindeman et al.

[11] Patent Number: 6,107,414
[45] Date of Patent: Aug. 22, 2000

[54] PROTECTED FUNCTIONALIZED HETEROTELECHELIC POLYMERS AND PROCESSES FOR PREPARING THE SAME

[75] Inventors: James Anthony Schwindeman, Lincolnton, N.C.; Roderic Paul Quirk, Akron, Ohio; Conrad William Kamienski, deceased, late of Gastonia, N.C., by D*iane* B*uschke* K*amienski*, executrix

[73] Assignee: FMC Corporation, Philadelphia, Pa.

[21] Appl. No.: 09/196,289

[22] Filed: Nov. 19, 1998

Related U.S. Application Data

[62] Division of application No. 08/893,951, Jul. 16, 1997, Pat. No. 5,910,547.
[60] Provisional application No. 60/021,906, Jul. 17, 1996.

[51] Int. Cl.⁷ ...................................................... C08F 8/00
[52] U.S. Cl. .................. 525/355; 525/332.8; 525/337.9; 525/333.1; 525/333.2; 525/333.3; 525/333.5; 525/344
[58] Field of Search ..................... 525/355, 344

[56] References Cited

U.S. PATENT DOCUMENTS

| | | |
|---|---|---|
| 3,280,084 | 10/1966 | Zelinski et al. . |
| 3,326,881 | 6/1967 | Uraneck et al. . |
| 3,629,172 | 12/1971 | Jones . |
| 3,639,517 | 2/1972 | Kitchen et al. . |
| 3,719,730 | 3/1973 | Hansley et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,956,232 | 5/1976 | Uraneck et al. . |
| 3,985,830 | 10/1976 | Fetters et al. . |
| 4,039,593 | 8/1977 | Kamienski et al. . |
| 4,052,370 | 10/1977 | Halasa et al. . |
| 4,753,991 | 6/1988 | Bronstert . |
| 4,994,526 | 2/1991 | Peters . |
| 5,166,277 | 11/1992 | Goodwin et al. . |
| 5,310,490 | 5/1994 | Struglinski et al. . |
| 5,310,814 | 5/1994 | Struglinski et al. . |
| 5,321,148 | 6/1994 | Schwindeman . |
| 5,331,058 | 7/1994 | Shepherd et al. . |
| 5,336,726 | 8/1994 | DuBois . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,405,911 | 4/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |
| 5,502,131 | 3/1996 | Antkowiak et al. . |
| 5,521,255 | 5/1996 | Roy . |
| 5,565,526 | 10/1996 | Schwindeman et al. . |
| 5,567,774 | 10/1996 | Schwindeman et al. . |

FOREIGN PATENT DOCUMENTS

| | | |
|---|---|---|
| 0 189 672 | 8/1986 | European Pat. Off. . |
| 0 593 049 | 4/1994 | European Pat. Off. . |
| 0 632 075 | 1/1995 | European Pat. Off. . |
| 2 118 952 | 11/1983 | United Kingdom . |
| 2 241 239 | 8/1991 | United Kingdom . |
| 2 270 317 | 3/1994 | United Kingdom . |
| WO 91/12277 | 8/1991 | WIPO . |
| WO 93/04094 | 3/1993 | WIPO . |
| WO 95/22566 | 8/1995 | WIPO . |
| WO 95/05176 | 2/1997 | WIPO . |
| WO 97/06192 | 2/1997 | WIPO . |

OTHER PUBLICATIONS

M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31, 1988).
A.J. Dias et al., *Macromolecules* 20, 2068–2076 (1987).
L. Weber, "Functionalization of Living Polymers—Results and Problems," *Makromol. Chem., Macromol. Symp.* 3, 317–329 (1986).

*Primary Examiner*—Bernard Lipman
*Attorney, Agent, or Firm*—Alston & Bird LLP

[57] ABSTRACT

Protected, functionalized heterotelechelic polymers, hydrogenated and/or deprotected analogues thereof, and processes to prepare these polymers. Monomers are polymerized using a protected functionalized initiator to form a living polymer, and the living polymer is reacted with an electrophile to form heterotelechelic polymers.

3 Claims, No Drawings

PROTECTED FUNCTIONALIZED HETEROTELECHELIC POLYMERS AND PROCESSES FOR PREPARING THE SAME

CROSS REFERENCE TO RELATED APPLICATION

This application is a divisional application of U.S. application Ser. No. 08/893,951, filed Jul. 16, 1997, now U.S. Pat. No. 5,910,547, which related to commonly owned copending Provisional Application Ser. No. 60/021,906, filed Jul. 17, 1996.

FIELD OF THE INVENTION

This invention relates to functionalized polymers and processes for preparing the same. More particularly, the invention relates to heterotelechelic functionalized polymers.

BACKGROUND OF THE INVENTION

Telechelic polymers (i.e., polymers having terminal functional groups) can be used in a variety of applications, such as the manufacture of adhesives, sealants, coatings, films, fibers, and the like. These polymers have typically been prepared using dilithium initiators. See U.S. Pat. Nos. 5,393, 843 and 5,405,911. For example, reaction of two equivalents of an alkyllithium reagent, such as sec-butyllithium, with a compound having at least two independently polymerized vinyl groups, such as isomeric divinylbenzenes or isomeric diisopropenylbenzenes, generates a dilithium initiator. Addition of an anionically polymerizable monomer, such as 1,3-butadiene, isoprene, or styrene, affords a polymer chain with living anions on each of the two termini (a "dianion"). This dianion can then be quenched with various functionalizing agents to afford a telechelic polymer.

These functionalization reactions, however, are often inefficient, due to the formation of physical gelation phenomena that produce severe mixing problems. See L. Weber, Makromol. Chem., Macromol. Symp., 3, 317 (1986) and U.S. Pat. Nos. 5,393,843 and 5,478,899. In addition, polymers prepared from dilithium initiators necessarily have the same functional group on each termini (are "homotelechelic").

Electrophiles that contain protected functional groups have been employed to functionalize polystyryl lithium and polyisoprenyl lithium. For example, Deffieux and co-workers reported that chloroacetals afforded high yields of functionalized polystyrene. See Polymer International 41, 453 (1996). Additional references to the use of protected functionalized electrophiles include: M. Tokyamo, A. Hirao, S. Nakahama and K. Takenaka, Macromol. Chem. Phys., 197, 3135 (1996); A. Hirao, H. Nagahama, T. Ishizone, and S. Nakahama, Macromolecules, 26, 2145 (1993), and K. Ueda, A. Hirao, and S. Nakahama, Macromolecules, 23, 939 (1990). The polymers produced in each of these syntheses, however, are monofunctional.

SUMMARY OF THE INVENTION

The present invention provides novel protected, functionalized heterotelechelic polymers (polymers having different functional groups on opposing termini), as well as hydrogenated and/or deprotected analogues thereof. In contrast to telechelic polymers of the prior art, the molecular architecture of compounds of the present invention can be precisely controlled. High functionalization of the living polymer anions can be achieved, as the functionalizing agents of the current invention do not cause gelation when added to a living polymer. The nature of the functional group on each terminus, and its protecting group, can also be varied simply by changing the functionalized initiator or the functionalizing agent.

The invention also provides processes for preparing these compounds. The processes of the invention can provide efficient functionalization of the living polymer anions.

DETAILED DESCRIPTION OF THE INVENTION

The protected heterotelechelic polymers of the present invention can be generally described by the following formula:

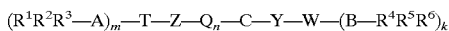

wherein:

C represents a hydrogenated or unsaturated block derived by anionic polymerization of one or more conjugated diene hydrocarbons, one or more alkenylsubstituted aromatic hydrocarbons, or mixtures thereof;

Y and Z are independently branched or straight chain hydrocarbon connecting groups which contains 3–25 carbon atoms optionally substituted with aryl or substituted aryl containing lower alkyl, lower alkylthio, or lower dialkylamino groups;

Q is an unsaturated hydrocarbyl group derived by incorporation of one or more conjugated diene hydrocarbons, one or more alkenylsubstituted aromatic hydrocarbons, or mixtures thereof;

T and W are each independently selected from oxygen, sulfur, and nitrogen;

$(A—R^1R^2R^3)_m$ and $(B—R^4R^5R^6)_k$ are each protecting groups in which A and B are elements independently selected from Group IVa of the Periodic Table of the Elements; and $R^1$, $R^2$, $R^3$, $R^4$, $R^5$ and $R^6$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; and k and m are 1 when T or W is oxygen or sulfur, and 2 when T or W is nitrogen; and n is an integer from 0 to 5, with the proviso that $—T—(A—R^1R^2R^3)_m$ and $W—(B—R^4R^5R^6)_k$ are not the same.

As used herein the term "with the proviso that $T—(A—R^1R^2R^3)$ and $W—(B—R^4R^5R^6)_k$ are not the same" refers to polymers in which the protected functional groups T and W differ and in which the respective protecting groups are the same or different; or in which T and W are the same and the respective protecting groups differ.

In one preferred embodiment of the invention, each C block is hydrogenated 1,3-butadiene having a peak molecular weight from 500 to 350,000. Still further, preferably the 1,2-polymerization of the hydrogenated butadiene is between 40% and 60%. In another preferred embodiment of the invention, each C block is hydrogenated isoprene having a peak molecular weight from 500 to 350,000.

To prepare the telechelic polymers of the present invention, living polymer anions are prepared by anionically polymerizing at least one monomer in an inert solvent at a temperature from −30° C. to 150° C. for a period of at least one hour with a protected functionalized initiator having the formula:

$$M—Q_n—Z—T—(A—R^1R^2R^3)_m \quad (I)$$

wherein:
M is an alkali metal selected from the group consisting of lithium, sodium and potassium;
and each of Q, n, Z, T, A, $R^1$, $R^2$, $R^3$ and m are the same as defined above.

The protected functional initiators of formula (I) include omega-(tert-alkoxy)-1-alkyllithiums; omega-(tert-alkoxy)-1-alkyllithiums chain extended with conjugated alkadiene hydrocarbons, alkenylsubstituted aromatic hydrocarbons and mixtures thereof; omega-(tert-alkylthio)-1-alkyllithiums; omega-(tert-alkylthio)-1-alkyllithiums chain extended with conjugated alkadiene hydrocarbons, alkenyl-substituted aromatic hydrocarbons, and mixtures thereof; omega-(tert-butyldimethylsilyloxy)-1-alkyllithiums; omega-(tert-butyldimethylsilyloxy)-1-alkyllithiums chain extended with conjugated alkadiene hydrocarbons, alkenyl-substituted aromatic hydrocarbons, and mixtures thereof; omega-(tert-butyldimethylsilylthio)-1-alkyllithiums; omega-(tert-butyldimethylsilylthio)- 1-alkyllithiums chain extended with conjugated alkadiene hydrocarbons, alkenyl-substituted aromatic hydrocarbons, and mixtures thereof; omega-(dialkylamino)-1-alkyllithiums; omega-(dialkylamino) -1-alkyllithiums chain-extended with conjugated alkadiene hydrocarbons, alkenylsubstituted aromatic hydrocarbons, and mixtures thereof; omega-(bis-tert-alkylsilylamino)alkyllithiums; and omega-(bis-tert-alkylsilylamino) alkyllithiums chain extended with conjugated alkadiene hydrocarbons, alkenylsubstituted aromatic hydrocarbons, and mixtures thereof.

Examples of protected functionalized organolithium initiators (I) include, but are not limited to, tert-alkoxy-alkyllithiums such as 3-(1,1-dimethylethoxy)-1-propyllithium and its more hydrocarbon-soluble isoprene chain-extended oligomeric analog (n=2 in formula (I) above), 3-(tert-butyldimethylsilyloxy)-1-propyllithium (n=0), tert-alkylthio-alkyllithiums such as 3-(1,1-dimethylethylthio)-1-propyllithium and its more hydrocarbon-soluble isoprene chain-extended oligomeric analog (n=2), 3-(dimethylamino)-1-propyllithium and its more hydrocarbon-soluble isoprene chain-extended oligomeric analog (n=2) and 3-[di-(tert-butyldimethylsilyl)amino]-1-propyllithium, and mixtures thereof. Further examples of protected functionalized initiators that may be employed in this invention include, but are not limited to, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-2-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1 -dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, and their more hydrocarbon soluble conjugated alkadiene or alkenylsubstituted aromatic chain extended oligomeric analogs (n=1–5 in formula (I) above).

The initiators of the formula $$M—Q_n—Z—T—(A—R^1R^2R^3) \quad (I)$$

can be prepared by reacting a compound of the formula $$M—Z—T—(A—R^1R^2R^3)_m \quad (II)$$

wherein M, Z, T, A, $R^1$, $R^2$, $R^3$, and m have the meanings ascribed above, with one or more conjugated diene hydrocarbons, one or more alkenylsubstituted aromatic hydrocarbons, or mixtures thereof to form an extended hydrocarbon chain between M and Z in formula (II), which extended chain is denoted as $Q_n$ in formula (I). The compounds of formula (II) can be prepared by reacting in an inert solvent a selected tertiary amino-1-haloalkane or an omega-hydroxy-protected-1-haloalkane or an omega-thio-protected-1-haloalkane, depending on whether "T" is to be N, O, or S, respectively, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of formula II) which is then optionally reacted with a one or more conjugated diene hydrocarbons, one or more alkenylsubstituted aromatic hydrocarbons, or mixtures thereof, in a predominantly alkane, cycloalkane, or aromatic reaction solvent, which solvent contains 5 to 10 carbon atoms, and mixtures of such solvents, to produce a monofunctional initiator with an extended chain or tether between the metal atom (M) and element (T) in formula (I) above and mixtures thereof with compounds of Formula (II).

Incorporation of Q groups into the M—Z linkage to form the compounds of formula (I) above involves addition of compounds of the formula $$M\text{—}Z\text{—}T\text{—}(A\text{—}R^1R^2R^3)_m \quad (II)$$

wherein M, Z, T, A, $R^1$, $R^2$, $R^3$, and m have the meanings ascribed above, across the carbon to carbon double bonds in compounds selected from the consisting of one or more conjugated diene hydrocarbons, one or more alkenylsubstituted aromatic hydrocarbons, or mixtures thereof, to produce new carbon-lithium bonds of an allylic or benzylic nature, similar to those found in a propagating polyalkadiene or polyarylethylene polymer chain derived by anionic initiation of the polymerization of conjugated dienes or arylethylenes. These new carbon-lithium bonds are now "activated" toward polymerization and so can be much more efficient in promoting polymerization than the precursor M—Z (M=Li) bonds, themselves. As used herein, the reference to mixtures thereof refers to mixtures of conjugated dienes, mixtures of alkenylsubstituted aromatic hydrocarbons, and mixtures of one or more conjugated dienes with one or more alkenyl-substituted aromatic hydrocarbons.

Exemplary tertiary amino initiators which are soluble in hydrocarbon solvents and which are useful in the practice of the present invention are described in U.S. Pat. Nos. 5,496,940 and 5,527,753, the entire disclosure of each of which is hereby incorporated by reference. These initiators are derived from omega-tertiary-amino-1-haloalkanes of the following general structures:

$$X\text{—}Z\text{—}N(A(R^1R^2R^3))_2 \quad (III)$$

and

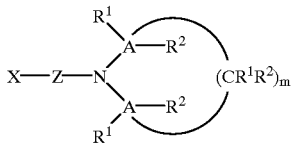

(IV)

wherein: X is halogen, preferably chlorine or bromine; and Z, A, $R^1$, $R^2$, $R^3$, and m are the same as defined above.

Exemplary monofunctional ether initiators which are soluble in hydrocarbon solvents and which are useful in the practice of the present invention are described in U.S. Pat. No. 5,600,021, the entire disclosure of which is also incorporated by reference. Alkoxy, alkylthio or dialkylamino substituted ethers, for example 6-[3-(methylthio)-1-propyloxy]-1-chlorohexane) can also be synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The monofunctional ether initiators are derived from omega-protected-hydroxy-1-haloalkanes of the following general structure:

$$X\text{—}Z\text{—}O\text{—}(C\text{—}R^1R^2R^3) \quad (V)$$

wherein: X is halogen, preferably chlorine or bromine; and Z, $R^1$, $R^2$ and $R^3$ are as defined above.

Exemplary monofunctional silyl ether initiators which are soluble in hydrocarbon solvents and which are useful in the practice of the present invention are described in U.S. Pat. No. 5,362,699, the entire disclosure of which is also hereby incorporated by reference. These initiators can be derived from omega-silyl-protected-hydroxy-1-haloalkanes of the following general structure:

$$X\text{—}Z\text{—}O\text{—}(Si\text{—}R^1R^2R^3) \quad (VI)$$

wherein: X is halogen, preferably chlorine or bromine; Z is as defined above; and $R^1$, $R^2$, and $R^3$ are independently defined as saturated and unsaturated aliphatic and aromatic radicals.

Monofunctional thioether initiators useful in the practice of this invention can be derived from omega-protected-thio-1-haloalkanes of the following general structure:

$$X\text{—}Z\text{—}S\text{—}(A\text{—}R^1R^2R^3) \quad (VII)$$

wherein: X is halogen, preferably chlorine or bromine; and Z, A, $R^1$, $R^2$, and $R^3$ are the same as defined above. To prepare the initiators, selected omega-thioprotected-1-haloalkyls whose alkyl groups contain 3 to 25 carbon atoms are reacted with alkali metal, preferably lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional thioether initiators are conducted in an inert solvent, preferably a non-polar solvent, optionally containing an ethereal modifier, using an olefinic monomer such as conjugated dienes, alkenylsubstituted aromatic hydrocarbons, and mixtures thereof, a temperature of about −30° C. to about 150° C. The polymerization reaction proceeds from initiation to propagation to linking and is finally terminated with appropriate reagents. The polymer before coupling with a polyfunctional linking agent may have a molecular weight range of about 1000 to 40,000 but the molecular weight can be higher. Typically 5 to 50 milli-moles of initiator is used per mole of monomer.

The initiator precursor, omega-thio-protected-1-haloalkanes (halides), can be prepared from the corresponding halothiol by the standard literature methods. For example, 3-(1,1-dimethylethylthio)-1-propylchloride can synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylthylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involved the reaction of the appropriate thiol with 2-methyl-2-butene catalyzed by boron trifluoride etherate can be employed for the preparation of the t-amyl thioethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org. Chem., 58, 1993, 6470. Methoxymethylthio compounds, such as 6-(methoxymethylthio)-1-hexylchloride, can be prepared by the reaction of the omega-chloro-thiol with bromochloromethane, methanol, and potassium hydroxide, by the method of F. D. Toste and I. W. J. Still, Synlett, 1995, 159. t-Butyldimethylsilyl protected compounds, for example 4-(t-butyldimethylsilylthio)-1-butylhalide, can be prepared from t-butyldimethylchlorosilane, and the corresponding thiol, according to the method described in U.S. Pat. No. 5,493,044.

Omega-thio-protected 1-haloalkanes useful in practicing this invention include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is selected from chlorine and bromine.

After the living anions are prepared as discussed above, an equivalent of a functionalizing agent (electrophile) is added to the living polymer. The functionalizing agent has the following structure:

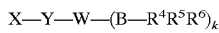

wherein:

X is halogen, preferably chloride, bromide or iodide; and each of Y, W, B, $R^4$, $R^5$, $R^6$, and k are the same as defined above.

The process of the invention can provide efficient synthesis of protected heterotelechelic polymers. The nature of the protected functional groups or the heteroatom can be varied by merely changing the identity of the functional initiator or the electrophile.

The monomer(s) to be anionically polymerized can be selected from any suitable monomer capable of anionic polymerization, including conjugated alkadienes, alkenyl-substituted aromatic hydrocarbons, and mixtures thereof. The dienes may be polymerized alone, or in admixture with each other or with alkenylsubstituted aromatic hydrocarbons to form random copolymers, or by charging the dienes to the reaction mixture sequentially, either with each other or with alkenylsubstituted aromatic hydrocarbons, to form block copolymers. Examples of conjugated alkadiene hydrocarbons include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene. Examples of alkenyl-substituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methyl-1-hexene and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include; 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Reference is made to U.S. Pat. No. 3,377,404 for disclosures of additional alkenyl substituted aromatic compounds. As used herein, the reference to mixtures of monomers refers to mixtures of conjugated dienes, mixtures of alkenylsubstituted aromatic hydrocarbons, and mixtures of one or more conjugated dienes with one or more alkenylsubstituted aromatic hydrocarbons.

The inert solvent employed during the polymerizations is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include, but are not limited to, inert liquid alkanes, cycloalkanes and aromatic solvents such as alkanes and cycloalkanes containing five to ten carbon atoms such as pentane, hexane, cyclohexane, methylcyclohexane, heptane, methylcycloheptane, octane, decane and so forth and aromatic solvents containing six to ten carbon atoms such as benzene, toluene, ethylbenzene, p-xylene, m-xylene, o-xylene, n-propylbenzene, isopropylbenzene, n-butylbenzene, and the like.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to, diethyl ether, dibutyl ether, tetrahydrofuran, 2-methyltetrahydrofuran, methyl tert-butyl ether, 1,2-dimethoxyethane (glyme), 1,2-diethoxyethane, diazabicyclo [2.2.2]octane, triethylamine, tributylamine, N-methylpiperidine, N-methylpyrrolidine, and N,N,N',N'-tetramethylethylene diamine (TMEDA). The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

The functionalizing agents, or electrophiles, can be prepared as described, for example, in International Publication WO 97/16465, the entire disclosure of which is incorporated by reference. In addition, the electrophiles can be prepared as described in M. Tokyamo, A. Hirao, S. Nakahama and K. Takenaka, Macromol. Chem. Phys., 197, 3135 (1996); K.

Ueda, A. Hirao, and S. Nakahama, Macromolecules, 23, 939 (1990); U.S. Pat. No. 5,496,940; U.S. Pat. No. 5,600,021; U.S. Pat. No. 5,362,699; A. Alexakis, M. Gardette, and S. Colin, Tetrahedron Letters, 29, 1988, 2951; B. Figadere, X. Franck, and A. Cave, Tetrahedron Letters, 34, 1993, 5893; J. Almena, F. Foubelo, and M. Yus, Tetrahedron, 51, 1995, 11883; D. F. Taber and Y. Wang, J. Org. Chem., 58, 1993, 6470; F. D. Toste and I. W. J. Still, Synlett, 1995, 159; and U.S. Pat. No. 5,493,044, the entire disclosure of each of which is also incorporated by reference.

The polymers of the invention can optionally be hydrogenated to provide additional novel polymers. The protecting groups can be removed either prior to or following this hydrogenation. The deprotected polymers are also novel.

Examples of methods to hydrogenate the polymers of this invention are described in U. S. Pat. Nos. 4,970,254, 5,166,277, 5,393,843 and 5,496,898. The hydrogenation of the functionalized polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with an archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction can be conducted until at least 90% of the aliphatic unsaturation has been saturated. The hydrogenated functional polymer can then be recovered by conventional procedures, such as removal of the catalyst with aqueous acid wash, followed by solvent removal or precipitation of the polymer.

If desired, the protecting groups can be removed from the heterotelechelic polymer. This deprotection can be performed either prior to or after the optional hydrogenation of the residual aliphatic unsaturation. For example, to remove tert-alkyl-protected groups, the protected polymer is mixed with Amberlyst® 15 ion exchange resin and heated at an elevated temperature, for example 150° C., until deprotection is complete. In addition, tert-alkyl-protected groups can also be removed by reaction of the star polymer with trifluoroacetic acid, p-toluenesulfonic acid or trimethylsilyliodide. Additional methods of deprotection of the tert-alkyl protecting groups can be found in T. W. Greene and P. G. M. Wuts, Protective Groups in Organic Synthesis, Second Edition, Wiley, N.Y., 1991, page 41. The tert-butyldimethylsilyl protecting groups can be removed by treatment of the star polymer cement with acid, such as hydrochloric acid, acetic acid, para-toluenesulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, N.Y., 1991, pages 80–83.

If the protecting groups on each end of the telechelic polymer are the same, or can be removed the same deprotection procedure, complete deprotection of the polymer can be achieved in a single step. After complete deprotection, the produced telechelic polymer has the following structure:

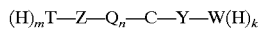

wherein: C, Q, Z, T, Y, W, k, m, and n are the sane as defined above.

The present invention also provides processes for the preparation of polymers possessing one free telechelically functional group and one protected telechelically functional group. This process comprises selectively deprotecting one type of dissimilarly protected functionality on the end(s) of the arms of the polymer chains, produced as described above, using selective reagents specifically suited to remove the targeted protective group, for example, the protecting group —A—$R^1R^2R^3$, and liberate the desired functionality, for example, —T—$(H)_m$, on the end of the polymer chain.

The following table details experimental conditions that will selectively remove one of the protecting groups (more labile) from the polymer, while retaining the other protecting group (more stable).

| LABILE | STABLE | CONDITIONS |
| --- | --- | --- |
| t-Butyldimethylsilyl | t-Butyl | Tetrabutylammonium fluoride |
| t-Butyldimethylsilyl | t-Butyl | 1 N HCl |
| t-Butyldimethylsilyl | Dialkylamino | Tetrabutylammonium fluoride |
| t-Butyldimethylsilyl | Dialkylamino | 1 N HCl |
| t-Butyl | Dialkylamino | Amberlyst ® resin |
| t-Amyl | Dialkylamino | Amberlyst ® resin |
| Trimethylsilyl | t-Butyl | Tetrabutylammonium fluoride |
| Trimethylsilyl | t-Butyl | 1 N HCl |
| Trimethylsilyl | Dialkylamino | Tetrabutylammonium fluoride |
| Trimethylsilyl | Dialkylamino | 1 N HCl |
| 2,2,5,5-Tetramethyl-2,5-disila-1-azacyclopentane | t-Butyl | Tetrabutylammonium Fluoride |
| 2,2,5,5-Tetramethyl-2,5-disila-1-azacyclopentane | t-Butyl | 1 N HCl |
| 2,2,5,5-Tetramethyl-2,5-disila-1-azacyclopentane | Dialkylamino | Tetrabutylammonium Fluoride |
| 2,2,5,5-Tetramethyl-2,5-disila-1-azacyclopentane | Dialkylamino | 1 N HCl |

If desired, the protecting groups can be selectively removed from the polymer in the presence of each other either prior to or after the optional hydrogenation of the residual aliphatic unsaturation. For example, tert-butyldimethylsilyl protecting groups can be removed by treatment of a polymer with acid, such as hydrochloric acid, acetic acid, p-toluenesulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, N.Y., 1991, pages 80–83. To remove tert-alkyl-protected groups, the protected polymer is mixed with a heterogeneous acid system such as Amberlyst® 15 ion exchange resin and heated at an elevated temperature, for example 150° C., until deprotection is complete. Exemplary heterogeneous acid systems include without limitation acid ion exchange resins, such as Amberlyst® 15, a commercially available polystyrene-based resin with sulfonic acid groups, Dowex® 50, a commercially available polystyrene-based resin from Dow Chemical, Reillex® 425 HCl, a commercially available polyvinyl pyridine-based resin from Reilly Tar and Chemical, acid clays, and the like. In addition, tert-alkyl-protected groups can also be removed to varying extents by reaction of the polymer with trifluoroacetic acid, acetic anhydride and ferric chloride, para-toluenesulfonic acid or trimethylsilyliodide. Additional methods of deprotection of the tert-alkyl protecting groups can be found in T. W. Greene and P. G. M. Wuts, Protective Groups in Organic Synthesis, Second Edition, Wiley, N.Y., 1991, page 41. However, when both kinds of protective groups are present in a polymer one must exert care not to use a reagent for the removal of t-butyldimethylsilyl groups which is also strong enough to remove t-butyl groups, such as, e.g., para-toluenesulfonic acid. A better choice to remove t-butyldimethylsilyl protective groups in the presence of t-butyl protective groups would be 1N HCl, or tetrabutylammonium fluoride, as shown in the above table. para-Toluenesulfonic acid, on the other hand, would be a poor choice as it removes both groups.

After selective deprotection, the novel polymer has one of the following structures:

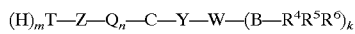

or

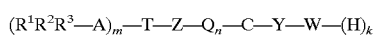

wherein A, B, C, $R^1$, $R^2$, $R^3$, $R^4$, $R^5$, $R^6$, Q, Y, Z, T, W, n, k and m are defined as above.

Advantages of the heterotelechelic polymers produced by the present invention include: highly efficient functionalization of the living anion sites on the arms of the polymer; various heteroatoms can be introduced by changing the nature of the initiator or the electrophile; different protecting groups can be employed to mask the heteroatoms; and the different protecting groups can be selective removed, to afford a mono-protected telechelic polymer.

The different protecting groups can be selectively removed, if desired, and the newly liberated functional group can be further derivatized or copolymerized.

The present invention will be further illustrated by the following non-limiting examples.

EXAMPLE 1

Synthesis of Alpha-hydroxy-omega-dimethylamino Functionalized Polystyrene

Styrene and benzene were purified according to the conventional methods for anionic polymerization. A solution of 3-(1,1-dimethylpropyloxy)-1-propyllithium in cyclohexane, chain extended with two moles of isoprene, 12.1 ml ($6.67 \times 10^{-3}$M) was injected into the reactor. Purified benzene (250 ml) was distilled into the reactor and then the reactor was flame sealed off. The ampule containing 22 ml of purified styrene was added to the reactor by breaking the break seal connection and the reaction allowed to proceed for 6 hours at room temperature. An ampule containing 200 ml of the resulting living polystyrene was sealed off for a further functionalization reaction and the small amount of residual polymer solution in the reactor was terminated with degassed methanol for determination of molecular weight. The contents of the ampule which contained $4.90 \times 10^{-3}$M of living polystyryl lithium chain ends was functionalized by successive addition of 0.21 grams (1.0 equivalent) of dry lithium chloride and $7.36 \times 10^{-3}$ moles (1.5 equivalents) of purified 3-(dimethylamino)-1-propylchloride (DMAPC) in benzene. The functionalization reaction was carried out over an 8 hour period by dropwise addition of the DMAPC solution. After termination with DMAPC, alpha-alkoxy-omega-dimethylamino functionalized polystyrene was isolated by precipitation into a large amount of methanol. Molecular weight and polydispersity were determined by SEC as $M_n = 3250$ g/mol and $M_w/M_n = 1.11$ from SEC calibrated by polystyrene standards, with no dimer formation.

By TLC analysis using toluene/hexane mixture as an eluent, no unfunctionalized polymer was detected. The final product was further characterized by 1H-NMR spectroscopy which shows the characteristic chemical shift of the initiating head group and the dimethylamino group.

Deprotection of the alpha-omega functionalized polystyrene prepared above is achieved by reaction of the polymer with a ten fold excess of p-toluenesulfonic acid in refluxing benzene solution. When all the starting polymer is consumed, as indicated by TLC analysis, the reaction mixture is allowed to cool to room temperature. After neutralization with aqueous dilute NaOH, the product solution is washed with water and dried. After removal of the solvent, the isolated deprotected product is characterized by $^1$H-NMR spectroscopy which shows the absence of the t-amyl group.

EXAMPLE 2

Preparation of Alpha-hydroxy-omega-amino Functionalized Polystyrene

Styrene and benzene were purified as described previously. A solution of 3-(t-amyloxy)-1-propyllithium in cyclohexane, chain extended with two moles of isoprene, 6.9 ml ($2.07 \times 10^{-3}$M), was injected into the reactor. After distilling 200 ml of benzene into the reactor, the purified styrene monomer (14.5 g) was added to the solution by breaking the break seal. The reaction mixture was stirred at room temperature for six hours. A ten fold excess of 3-(2,2,5,5-tetramethyl-2,5-disila-1-azapentane)-1-chloropropane, as a solution in benzene, was added dropwise to the living polystyryllithium solution at room temperature and the reaction stirred for 6 hours. The alpha-omega functionalized polymer was precipitated by addition to an excess of methanol. Subsequent deblocking of the primary amine moiety of the polymer was carried out by simple hydrolysis in a dilute acid medium and resulted in a primary amine terminated polymer. The obtained number average molecular weight of the base polymer before functionalization was determined to be 7200 g/mole with an MWD of 1.15 from SEC calibrated by polystyrene standards. Alpha-amyloxy-omega-amino functionalized polystyrene was analyzed by TLC and no base polymer was detected. The tert-amyl group is removed as described in example 1, above.

EXAMPLE 3

Synthesis of Alpha-hydroxy-omega-thio Functionalized Polyisoprene

Cyclohexane and isoprene are purified before use. A solution of 4.2 ml of 3-(1,1-dimethylethoxy)-1-propyllithium in cyclohexane ($1.89 \times 10^{-3}$M) is injected into the reactor. After distilling 100 ml of purified cyclohexane into the reactor, a volume of 47 ml of purified isoprene is added into the reactor. After the reaction is complete, a solution of 3-(1,1-dimethylethylthio)-1-chloropropane (10-fold excess) in an equal volume of cyclohexane is added dropwise to the reactor and allowed to react for 6 hours. After the termination is complete, the alpha-alkoxy-omega-t-butylthio functionalized polystyrene is isolated by precipitation into a large amount of methanol. After washing with distilled water and drying, the solvent is removed. The molecular weight determined for the polymer is 4000 and the MWD is 1.06, from SEC calibrated by polyisoprene standards.

The resulting polymer is deprotected using the above described technique.

The foregoing examples are illustrative of the present invention and are not to be construed as limiting thereof.

That which is claimed is:

1. A process for selectively removing protecting groups from polymers, comprising:

treating a heterotelechelic polymer comprising the structure:

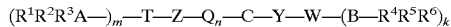

$(R^1R^2R^3A-)_m-T-Z-Q_n-C-Y-W-(B-R^4R^5R^6)_k$ wherein:

C is a hydrogenated or unsaturated block derived by anionic polymerization of at least one monomer selected from the group consisting of conjugated diene hydrocarbons, alkenylsubstituted aromatic hydrocarbons and mixtures thereof;

Y and Z are independently branched or straight chain hydrocarbon connecting groups containing 3–25 carbon atoms optionally substituted with aryl or substituted aryl containing lower alkyl, lower alkylthio, or lower dialkylamino groups;

Q is an unsaturated hydrocarbyl group derived by incorporation of at least one compound selected from the group consisting of conjugated diene hydrocarbons, alkenylsubstituted aromatic hydrocarbons, and mixtures thereof;

T and W are independently selected from oxygen, sulfur, and nitrogen;

$(A-R^1R^2R^3)_m$ and $(B-R^4R^5R^6)_k$ are protecting groups in which A and B are independently selected from elements of Group IVa of the Periodic Table of the Elements; $R^1$, $R^2$, $R^3$, $R^4$, $R^5$ and $R^6$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; and k and m are 1 when T or W is oxygen or sulfur, and 2 when T or W is nitrogen; and n is an integer from 0 to 5;

with the proviso that $-T-(A-R^1R^2R^3)_m$ and $W-(B-R^4R^5R^6)_k$ are not the same, under conditions sufficient to remove at least one of the protecting groups $-(A-R^1R^2R^3)_m$ and $-(B-R^4R^5R^6)_k$ without also removing the other protecting group.

2. The process of claim 1, wherein one of the protecting groups $-(A-R^1R^2R^3)_m$ and $-(B-R^4R^5R^6)_k$ is a tertiary-butyldimethylsilyl protecting group and the other of the protecting groups is a tertiary alkyl protecting group; and said treating step comprises heating the polymer in the presence of a heterogeneous acid system to selectively remove the tertiary alkyl protecting group without removing the tertiary-butyldimethylsilyl protecting group.

3. The process of claim 1, wherein one of the protecting groups $-(A-R^1R^2R^3)_m$ and $-(B-R^4R^5R^6)_k$ is a tertiary-butyldimethylsilyl protecting group and the other of the protecting groups is a tertiary alkyl protecting group; and said treating step comprises heating the polymer in the presence of hydrochloric acid to selectively remove the tertiary-butyldimethylsilyl protecting group without removing the tertiary alkyl protecting group.

* * * * *